Nov. 24, 1953  R. T. CLOUD  2,659,985
METHOD OF AND APPARATUS FOR PENDULUM COMPENSATING
Filed Aug. 16, 1947
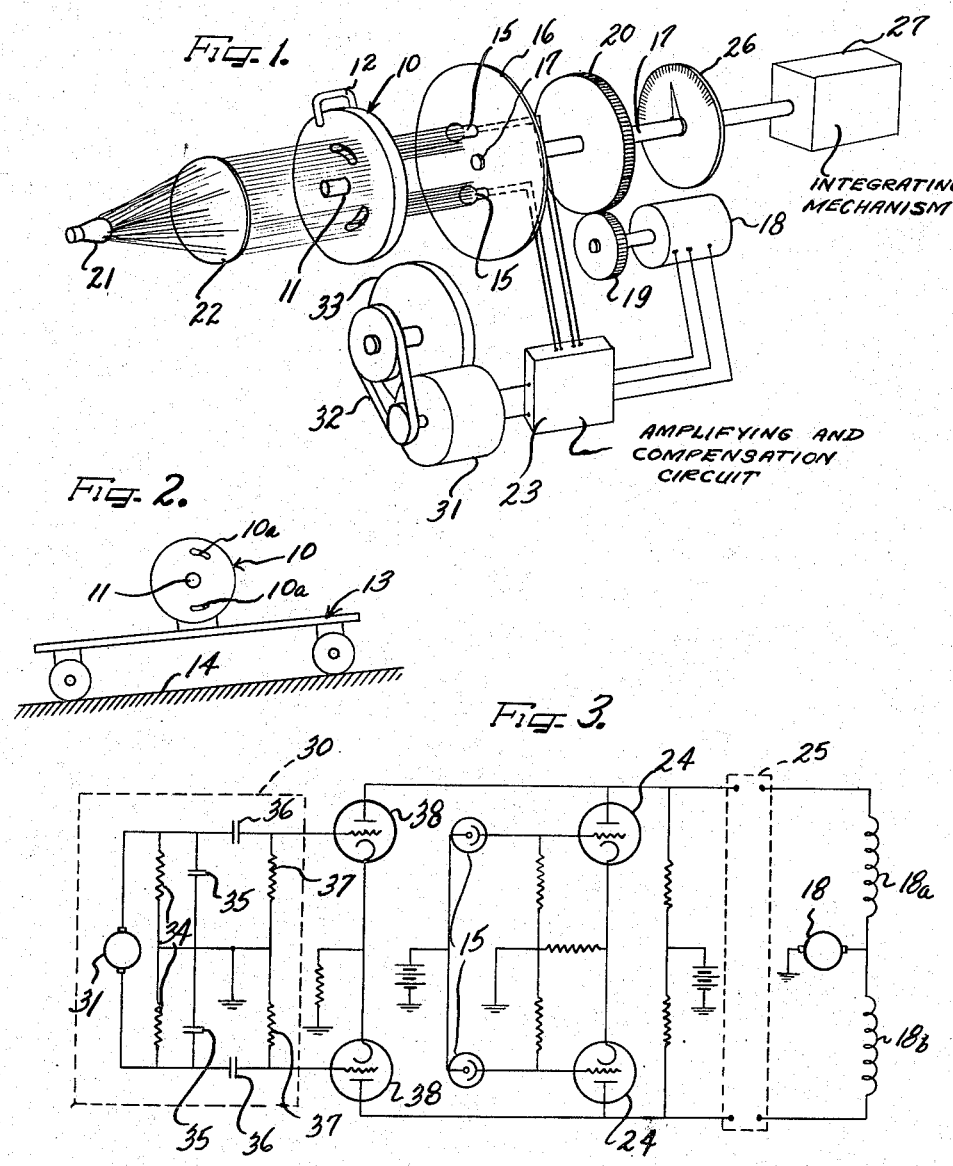
Inventor
RAYMOND T. CLOUD
by The Firm of Charles M. Kills
Attys.

Patented Nov. 24, 1953

2,659,985

UNITED STATES PATENT OFFICE 2,659,985

METHOD OF AND APPARATUS FOR PENDULUM COMPENSATING

Raymond T. Cloud, Houston, Tex., assignor to North American Geophysical Co., Houston, Tex., a corporation of Texas Application August 16, 1947, Serial No. 769,017

8 Claims. (Cl. 33—220)

This invention relates to mobile devices for measuring differences in altitude along a path traversed by the mobile device and particularly, to an improved method and apparatus for effecting the compensation of a pendulum-controlled altitude-measuring device to eliminate the effects of acceleration of the mobile device along its path upon the altitude measurement.

Devices have heretofore been known for effecting the measurement of differences in altitude along a path traversed by the device wherein the fundamental measuring unit of the device comprises a gravity-actuated pendulum and the sine of the angular displacements of such pendulum from its neutral position while the device traverses any desired path are integrated. The results of such integration afford a highly accurate indication of relative differences in altitude between any two points along the path between which such integration is accomplished. For reference convenience, I shall refer to this general type of device as a pendulum-controlled, integrating altimeter.

Such devices have been of great value in surveying and similar activities, particularly in seismic exploration, inasmuch as the devices may be mounted upon any mobile vehicle, such as a truck, wagon, or car, and will provide an accurate indication of relative altitude at any point along the vehicle path, irrespective of the deviations of the actual path that the vehicle traversed in arriving at such point. However, such known devices have been subject to the very serious disadvantage in that the acceleration or deacceleration of the vehicle with respect to the ground surface will also produce a displacement of the pendulum and hence introduce an erroneous factor into the altitude measurements effected by the device.

It has heretofore been proposed, for example, in my prior Patent No. 2,362,616, issued November 14, 1944, that the controlling pendulum be compensated to effectively neutralize the erroneous influences of vehicle acceleration. Such prior compensating devices have operated upon the principle of directly opposing the acceleration forces exerted upon the pendulum so as to prevent the reaction of the pendulum to such acceleration forces but to permit the pendulum to freely swing in response to changes in inclination of the vehicle upon which the pendulum is mounted. Such devices therefore required that a coil be mechanically connected to the shaft of the pendulum and a current supplied to such coil in cooperation with a magnetic field produced by an adjacent magnet to produce a torque on the pendulum to exactly neutralize the vehicle acceleration forces experienced by the pendulum. Such compensation arrangement has not been entirely satisfactory due to the fact that the mounting and centering of the coil with respect to the pendulum present considerable difficulty; that only a light weight pendulum may be utilized; and that extremely light and flexible connections to the coil are required so as to minimize interference with the gravitational displacements of the pendulum.

Accordingly, it is an object of this invention to provide an improved and simplified method and apparatus for effecting pendulum compensation of a pendulum-controlled integrating altimeter against the effects of vehicle acceleration.

A further object of this inventiton is to provide a method of and apparatus for neutralizing the effects of vehicle acceleration upon a pendulum-controlled type integrating altimeter wherein the pendulum is permitted to freely respond to both gravitational and acceleration forces but a pendulum follow-up mechanism is so arranged as to follow only those movements of the pendulum which are induced by gravity and not those movements induced by acceleration of the vehicle.

Still another object of this invention is to provide an acceleration-compensated, pendulum type integrating altimeter wherein the displacement of the pendulum from its neutral position generates a signal which controls a servo type of follow-up mechanism to produce a movement corresponding to that of the pendulum and wherein a second signal is generated as a function of the acceleration of the vehicle and applied to the servo type follow-up mechanism in opposition to the pendulum-generated signal so as to neutralize the response of the follow-up mechanism to any acceleration-induced displacements of the pendulum.

The specific nature of this invention, as well as other objects and advantages thereof will become apparent to those skilled in the art from the following detailed description of the annexed sheet of drawings which, by way of preferred example only, illustrates one particular embodiment of the invention.

On the drawings:

Figure 1 is a schematic perspective view of a pendulum type, integrating altimeter assembly embodying this invention.

Figure 2 is a schematic view illustrating the relative positioning of the pendulum of Figure 1 with respect to the vehicle upon which the entire device is carried.

Figure 3 is a circuit diagram of the electrical elements employed in the arrangement of Figure 1.

As shown on the drawings:

Referring to Figure 1, a typical pendulum-controlled, integrating altimeter to which the method and apparatus of this invention may be applied is illustrated as comprising a pendulum 10 in the form of a disc suitably mounted for free rotation about a supporting shaft 11. The disc 10 is either suitably weighted, or the axis of supporting shaft 11 made slightly eccentric with respect to the axis of the disc so that such disc will function as a gravitational pendulum having a relatively long period. If desired, an electromagnetic braking device 12 may be provided to cooperate with the pendulum disc 10 to damp out transient oscillations. As best shown schematically in Figure 2, the pendulum disc 10 is suitably supported upon a vehicle 13 in such manner that the pendulum will be displaced from its neutral position in response to changes of inclination of the road 14 traversed by the vehicle 13. With such an arrangement, it is obvious that the pendulum will also be subject to displacement forces produced by the acceleration or deacceleration of the vehicle in a direction along the road 14.

In accordance with this invention, the pendulum 10 is permitted to freely respond to both gravitational and acceleration displacement forces. A servo type of follow-up mechanism is provided to produce an indication of the displacement of the pendulum. While such mechanism may comprise any one of several well known forms, including mechanical, electrical or hydraulic systems, I preferably employ a servomotor system wherein a signal proportional to the displacement of the pendulum is generated by means of a pair of photocells 15, and such signal is then applied to the servo mechanism to produce a mechanical movement proportional to the displacement of the pendulum disc. The photocells 15 may be conveniently mounted upon a supporting disc 16 which is co-axially positioned with respect to pendulum disc 10 but is rotatable independently of the pendulum disc 10. For further details relative to the construction and arrangement of the photocells 15 with respect to the pendulum 10, reference may be had to my copending application, Serial No. 696,739, filed September 13, 1946, now Patent No. 2,598,355. The rotational position of shaft 17 is controlled by a servomotor 18 through gear connections 19 and 20.

A suitable light source 21 is provided together with a light concentrating device, such as a lens 22, to direct a beam of light against the pendulum disc 10. Suitable means are provided on pendulum disc 10 for normally directing equal amounts of incident light onto each of the photocells 15. For example, a pair of apertures 10a may be provided in disc 10 to transmit the light beam onto the photocells 15. Obviously, mirrors or other reflecting devices may be utilized in place of the apertures 10a to produce an arrangement wherein the amount of light on each photocell varies as a function of the displacement of pendulum 10.

The spacing of the apertures 10a is selected with respect to the spacing of the photocells 15 so that in the neutral position of the pendulum disc 10, equal amounts of light will impinge upon each of the photocells 15, but when the pendulum disc 10 is displaced from such neutral position, the illumination of the photocells 15 will be differentially affected, i. e., one cell will receive more or less light than the other cell. Such difference in illumination of the photocells is utilized to produce a differential signal which is applied through an amplifying and compensating circuit 23 to operate the servomotor 18 to produce a rotation of the photocell supporting disc 16 in such direction as to return the photocells 15 to their original relationship with respect to the pendulum disc 10 wherein equal amounts of light are incident upon both of the photocells.

Referring to Figure 3, the electrical connections between the photocells 15 and the servomotor 18 will be seen to comprise the direct connection of the photocells 15 respectively into the grid circuits of a pair of push-pull connected amplifying tubes 24. The output of the tubes 24 is applied to such additional stages of amplification, represented by the box 25, as may be required and then applied to the servomotor 18.

Servomotor 18 is preferably of the type which is directionally responsive to the relative energization of the photocells 15. Thus servomotor 18 may comprise a D. C. motor having a pair of fields 18a and 18b connected respectively between the plates of the last stage of the amplifier 25 and one side of the motor armature, while the other side of the motor armature is connected to ground. Hence, if one photocell 15 is energized to a greater extent than the other the motor 18 will operate in one direction, and then in a reverse direction when the relative energization of the photocells 15 is reversed. Thus the photocell supporting disc 16 will be shifted to accurately reproduce the displacement movement of the pendulum disc 10.

Such movement of the photocell-supporting disc 16 may be applied to a dial type indicator 26 to provide a visual indication of changes in angular inclination of the road bed 14 over which the vehicle 13 is traversed, or may be applied to any conventional form of mechanical integrating mechanism 27 in which the sine of the angular displacement is continuously intergrated to provide an indication proportional to the difference in altitude between any two separated points on the road 14 which is traversed by the vehicle 13, in a manner more particularly described in my above referred to patent.

The apparatus as heretofore described will, however, be subject to erroneous indications of altitude by virtue of displacement of the pendulum disc 10 produced by the acceleration or deacceleration of the vehicle 13. In accordance with this invention, such erroneous indications are substantially completely eliminated by the application of a compensating signal to the servo type follow-up mechanism, represented by photocells 15, amplifier 23 and motor 18, which signal is proportional to the acceleration of the vehicle 13 and is applied to the follow-up mechanism in opposition to that portion of the signal generated by the displacement of the pendulum disc 10 which is produced by the acceleration of the vehicle 13.

Thus I provide a signal generating unit 30 (Figure 3) for producing an electrical signal which is proportional to the acceleration of the vehicle 13. While such signal generator may comprise any one of several well-known forms, I preferably employ a direct current generator 31 which is driven through a suitable mechanical connection 32 by a wheel 33 which is in contact with the road 14 over which the vehicle 13 is transversed. The wheel 33 may, of course, conveniently comprise one of the supporting wheels of the vehicle 13.

The output of generator 31 is applied across a series connected pair of resistors 34 whose center point is grounded. Filter condensers 35 may be provided in parallel with resistors 34 to eliminate ripples and transient effects.

It will be recognized by those skilled in the art that the voltage appearing across the terminals of generator 31 is a proportional function of the velocity of the vehicle 13 with respect to the road. To obtain an electrical signal proportional to the acceleration of the vehicle 13, it is only necessary to differentiate the voltage output of the generator 31. Any well-known form of differentiating network may be employed for this purpose, such, for example, as a pair of series-connected condensers 36 and resistors 37 respectively connected between each side of the generator 31 and ground. The time constant of such differentiating circuits is selected to be substantially equal to that of the pendulum 10. The voltages across the resistors 37 are then respectively applied to the grids of a pair of amplifying tubes 38 and, as will be recognized by those skilled in the art, such grid voltages will represent a differential function of the voltage across the terminals of generator 31 and therefore will represent a function of the acceleration of the vehicle 13.

The output of amplifiers 38 are respectively directly connected to the plate circuits of the amplifier tubes 24 of the servo system. The polarity of the signal voltages thus applied to the servo system is selected as that the acceleration voltage derived from generator 31 is opposed to the signal voltage produced in the servo system by the acceleration-induced displacement of the pendulum disc 10. By suitable selection of circuit constants, it is obvious that the acceleration voltages may be made to exactly neutralize that portion of the signal voltages produced by the photoelectric cells 15 which is attributable to the acceleration-induced displacements of the pendulum disc 10.

Therefore, although the pendulum disc 10 is free to follow both gravitational and acceleration impulses, the follow-up mechanism will be responsive only to the gravitationally-induced movements of the pendulum disc 10. That is, the motor 18, hence the photocell-supporting disc 16, will follow only those movements of pendulum disc 10 which are attributable to differences in inclination of the road 14 traversed by the vehicle 13. Displacements of the pendulum disc 10 attributable to acceleration of the vehicle 13 will not produce a corresponding follow-up movement of the photocell disc 16. By the same token, neither the dial pointer 26 nor the integrating mechanism 27 will receive any erroneous displacements based upon displacements of the pendulum disc 10 attributable to acceleration forces.

Obviously, when the vehicle 13 is traveling at a uniform velocity, the compensating network will have no effect upon the follow-up servo mechanism, inasmuch as there will be no signal generated by the acceleration signal generating device.

From the foregoing description it is apparent that the method and apparatus of this invention provide an unusually convenient, economical and reliable compensation of acceleration effects upon the pendulum of a pendulum-controlled, integrating type altimeter. All compensation is effected in the servo type, follow-up mechanism of the apparatus and it is unnecessary to complicate the construction of the relatively delicate pendulum by the addition of coils or similar apparatus thereto.

It should be further understood that while the specific example illustrated comprises an electrical type of follow-up servo mechanism, the principles of this invention are equally applicable to mechanical or fluid types of servo mechanism, inasmuch as it is only necessary to generate a suitable mechanical or pressure signal responsive to acceleration of the vehicle and apply it to the servo mechanism in such manner as to oppose that portion of the signal produced by the displacement of the pendulum which is attributable to acceleration of the vehicle.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a vehicle-carried, pendulum controlled, electrical servo system having a follow-up mechanism independent of said pendulum movable by a signal produced as a function of the displacement of said pendulum, the improvements comprising a signal generating unit for producing a signal proportional to the acceleration of the vehicle, and electrical means including a differentiating network for applying said signal to said servo system in opposition to said first mentioned signal produced by said pendulum, thereby neutralizing the effects of acceleration-induced displacement of said pendulum upon said follow-up mechanism.

2. In a vehicle-carried, integrating altimeter, a pendulum, means independently movable with respect to said pendulum for generating a first signal proportional to displacement of said pendulum, motor-driven follow-up mechanism responsive to said first signal to return said signal-generating means to original positional relationship with said pendulum, means for generating a voltage proportional to the acceleration of the vehicle, and means including a differentiating circuit means for applying a differentiated voltage as a second signal to said motor-driven follow-up mechanism to neutralize that portion of said first signal which was produced by acceleration-induced displacement of said pendulum.

3. In a vehicle-carried integrating altimeter, a pendulum, photoelectric means movable independently of said pendulum for generating a first electrical signal proportion to displacement of said pendulum, motor-driven follow-up mechanism responsive to said first electrical signal to return said photoelectric means to original positional relationship with respect to said pendulum, means for generating a voltage proportional to the acceleration of the vehicle, and means including differentiating circuit means for applying a differentiated voltage as a second electrical signal to said motor-driven follow-up mechanism to neutralize that portion of said first electrical signal which is produced by acceleration-induced displacements of said pendulum.

4. In a vehicle-carried, integrating altimeter, a source of light, a pendulum adapted to control the emission from said light, a light controlled device independently rotatable of said pendulum for generating a first signal in response to displacement of said pendulum, motor means having a driving connection with said device and being responsive to said signal therefrom, means including a voltage generator and an output voltage differential circuit for generating a second signal proportional to the acceleration of the vehicle, and means for applying said second signal to said motor means to neutralize that portion of said first signal which was produced by acceleration-induced displacement of said pendulum.

5. A vehicle-carried elevation meter, comprising, in combination, a pendulum responsive to variations in the angle of inclination in a vehicle as said vehicle traverses a path, said pendulum adapted to control a beam of light, a source of light adjacent said pendulum for producing said beam of light, a light controlled device arranged so as to be responsive to variations of displacement of said pendulum, said device being independently rotatable for operation as a follower of said pendulum, motor means having a driving connection with said device and being responsive to a first signal produced thereby, a signal generating unit including a wheel driven voltage generator and an output voltage differential circuit for producing a second signal porportionate to the acceleration of said vehicle, and means for applying said second signal to said motor means in opposition to said first signal whereby said first signal will be neutralized to the extent by which it was produced through acceleration-induced displacement of said pendulum.

6. In a method of measuring differences in altitude along a translatory path of the surface of the earth, the improvement of compensating for translatory acceleration effects on a ground vehicle-carried, pendulum type, integrating altimeter having an electrically controlled followup mechanism movable proportionally with the pendulum, which improvement includes the steps of generating a voltage proportional to the acceleration of the vehicle, applying the voltage to an electric circuit for differentiating the voltage output to produce a signal, and applying this signal to the electrically controlled follow-up mechanism to neutralize the electrical signal produced by the acceleration-induced movements of the pendulum, whereby said pendulum freely reacts to gravitational as well as vehicle acceleration forces but no corresponding reaction to vehicle acceleration forces is produced on the follow-up mechanism.

7. In a vehicle-carried, integrating altimeter, a pendulum, means independently movable with respect to said pendulum for generating a first signal proportional to displacement of said pendulum, a motor-driven follow-up mechanism responsive to said first signal to return said signal-generating means to original positional relationship with said pendulum, means for generating a second signal proportional to the acceleration of the vehicle, and means for applying said second signal to said motor-driven follow-up mechanism to neutralize that portion of said first signal which was produced by acceleration-induced displacement of said pendulum, said second signal-generating means comprising a generator driven at a speed proportional to the velocity of the vehicle and a differentiating network connected to the output of said generator for producing a voltage signal proportional to the acceleration of said vehicle.

8. In a vehicle-carried integrating altimeter, a pendulum, photoelectric means movable independently of said pendulum for generating a first electrical signal proportional to displacement of said pendulum, a motor-driven follow-up mechanism responsive to said first electrical signal to return said photoelectric means to original positional relationship with respect to said pendulum, means for generating a second electrical signal proportional to the acceleration of the vehicle, and means for applying said second electrical signal to said motor-driven follow-up mechanism to neutralize that portion of said first electrical signal which is produced by acceleration-induced displacement of said pendulum, said signal-generating means comprising a generator driven at a speed proportional to the velocity of the vehicle and a differentiating network connected to the output of said generator for producing a voltage signal proportional to the acceleration of said vehicle.

RAYMOND T. CLOUD.

References Cited in the file of this patent

UNITED STATES PATENTS

| Number | Name | Date |
|---|---|---|
| 2,242,806 | Wunsch | May 20, 1941 |
| 2,313,733 | Crane | Mar. 16, 1943 |
| 2,362,616 | Cloud | Nov. 14, 1944 |
| 2,458,586 | Giroud | Jan. 11, 1949 |
| 2,524,934 | Silverman | Oct. 10, 1950 |
| 2,552,890 | Eisler | May 15, 1951 |